United States Patent
Barlow

(10) Patent No.: US 11,870,320 B2
(45) Date of Patent: Jan. 9, 2024

(54) PUMPING SEAL FOR ROTATING MACHINES

(71) Applicant: John Crane UK Limited, Slough (GB)

(72) Inventor: Graham Barlow, Slough (GB)

(73) Assignee: JOHN CRANE UK LIMITED, Slough (GB)

( * ) Notice: Subject to any disclaimer, the term of this patent is extended or adjusted under 35 U.S.C. 154(b) by 0 days.

(21) Appl. No.: 17/969,209

(22) Filed: Oct. 19, 2022

(65) Prior Publication Data

US 2023/0121617 A1  Apr. 20, 2023

Related U.S. Application Data

(60) Provisional application No. 63/257,273, filed on Oct. 19, 2021.

(30) Foreign Application Priority Data

May 13, 2022  (GB) .................................. 2207068.4

(51) Int. Cl.
| | | |
|---|---|---|
| H02K 5/124 | (2006.01) | |
| H02K 5/10 | (2006.01) | |
| H02K 16/02 | (2006.01) | |
| F16J 15/3204 | (2016.01) | |

(52) U.S. Cl.
CPC .......... H02K 5/124 (2013.01); F16J 15/3204 (2013.01); *H02K 2205/09* (2013.01)

(58) Field of Classification Search
CPC ...... H02K 5/124; H02K 2205/09; H02K 5/10; H02K 5/173; H02K 16/02

USPC .......................................................... 310/85
See application file for complete search history.

(56) References Cited

U.S. PATENT DOCUMENTS

| | | | |
|---|---|---|---|
| 5,713,576 A | 2/1998 | Wasser et al. | |
| 2018/0339782 A1* | 11/2018 | Razak | B64D 33/00 |

FOREIGN PATENT DOCUMENTS

| | | | | |
|---|---|---|---|---|
| CN | 109826960 A | | 5/2019 | |
| EP | 3421734 A1 | | 1/2019 | |
| WO | WO-2016080014 A1 * | | 5/2016 | ............. F01D 11/06 |
| WO | 2021202693 A1 | | 10/2021 | |
| WO | WO-2021202693 A1 * | | 10/2021 | ............. F01D 11/02 |

OTHER PUBLICATIONS

PCT International Search Report and Written Opinion for International Application No. PCT/GB2022052665 dated Jan. 24, 2023, 12 pages.
Abstract for CN109826960 (A), Published: May 31, 2019, 1 page.
GB Search Report for Application No. GB2207068.4, dated Jun. 10, 2022, 4 pages.

* cited by examiner

*Primary Examiner* — Jose A Gonzalez Quinones
(74) *Attorney, Agent, or Firm* — CANTOR COLBURN LLP

(57) ABSTRACT

A rotary machine includes a rotating shaft, a housing that surrounds a portion of the rotating shaft and has an initial pressure therein and a gas seal that pumps gas out of the housing to reduce pressure in the housing to an operating pressure that is less than the initial pressure.

19 Claims, 6 Drawing Sheets

PUMPING SEAL FOR ROTATING MACHINES

CROSS REFERENCE TO RELATED APPLICATIONS

This application claims the benefit of an earlier filing date from U.S. Provisional Application Ser. No. 63/257,273 filed Oct. 19, 2021 and GB Application No. 2207068.4 filed May 13, 2022, the entire disclosures of both which are incorporated herein by reference.

BACKGROUND

Exemplary embodiments pertain to the art of rotating machines and, in particular, to rotating machines that include a pumping seal.

Electric machines include a stator having stator windings mounted to a housing and a rotor including rotor windings that rotates relative to the stator. The stator windings may be excited to impart rotational forces on the rotor or, the rotation of the rotor may induce an electrical current in the stator windings. In the first operating mode, electrical current passes to the stator windings in the second operating mode, electrical current passes from the stator windings.

In either mode, the rotor will rotate relative to the stator. The rotor can include either magnets or coils depending on the type of electric machine.

SUMMARY

Exemplary embodiments pertain to rotating machines, in particular, any machine where a shaft that can rotate within an enclosed housing that includes the pumping seal. The enclosed housing contains the shaft within a fixed volume gas environment. The gas environment can be, but is not always, atmospheric air. The pumping seal will extract gas from the fixed volume thereby reducing its pressure. With the pressure reduced, any heat generation (energy waste) due to shaft rotation and gas churning will be reduced.

In one embodiment, a rotary machine is disclosed. In this embodiment, the machine includes a rotating shaft, a housing that surrounds a portion of the rotating shaft; and a gas seal that pumps gas out of the housing to reduce pressure in the housing to an operating pressure that is less than the initial pressure.

In any embodiment, herein the gas seal can pump gas out of the housing so that a pressure in the housing is less than atmospheric pressure.

In any prior embodiment, the pressure in housing can be reduced so that it is less than ½ atmospheric pressure such as less than 0.5 bar absolute.

In any prior embodiment, the rotating shaft can be a rotor of a motor or can include two portions joined together by coupling. If a coupling is used, it can be within the housing.

In any prior embodiment, the housing can include a bleed hole formed therein that allows gas to be drawn into the housing.

In any prior embodiment, the machine can include a valve that controls a flow of gas into the housing based on the pressure in the housing.

In any prior embodiment, the dry gas seal can include a mating ring that can be coupled to or part of the rotating shaft that rotates with the rotating shaft; and a primary ring.

In some cases, the machine can also optionally include a biasing member urges the primary ring towards the mating ring.

In any prior embodiment, the machine can include a sleeve ring that is coupled to the rotating shaft and carries the mating ring.

Also disclosed is a method of operating a rotating machine that includes a rotating shaft and a housing that surrounds a portion of the rotating shaft. This can be any of the machines disclosed or mentioned herein. The method includes sealing the shaft in the housing with a dry gas seal, establishing an initial pressure in the housing; and pumping gas out of the housing with the dry gas seal so that pressure in the housing is reduced from the initial pressure to a lower pressure.

In any prior method, the initial pressure can be atmospheric and the lower pressure is less than ½ atmospheric pressure such as less than 0.5 bar absolute. In embodiments, the initial pressure can be higher than external environmental pressure and the lower pressure is less than the initial pressure.

In any prior method, the rotating shaft is a rotor of a motor.

In any prior method, the rotating shaft includes two portions joined together by a coupling that can optionally be within the housing.

In any prior method, the housing can include a bleed hole formed therein and the method can also include drawing gas through the bleed hole into the housing to recharge the gas in the housing.

The method can also include having a machine and a valve that controls a flow of gas into the housing and further comprise allowing gas to flow into the housing through the valve based on the pressure in the housing.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
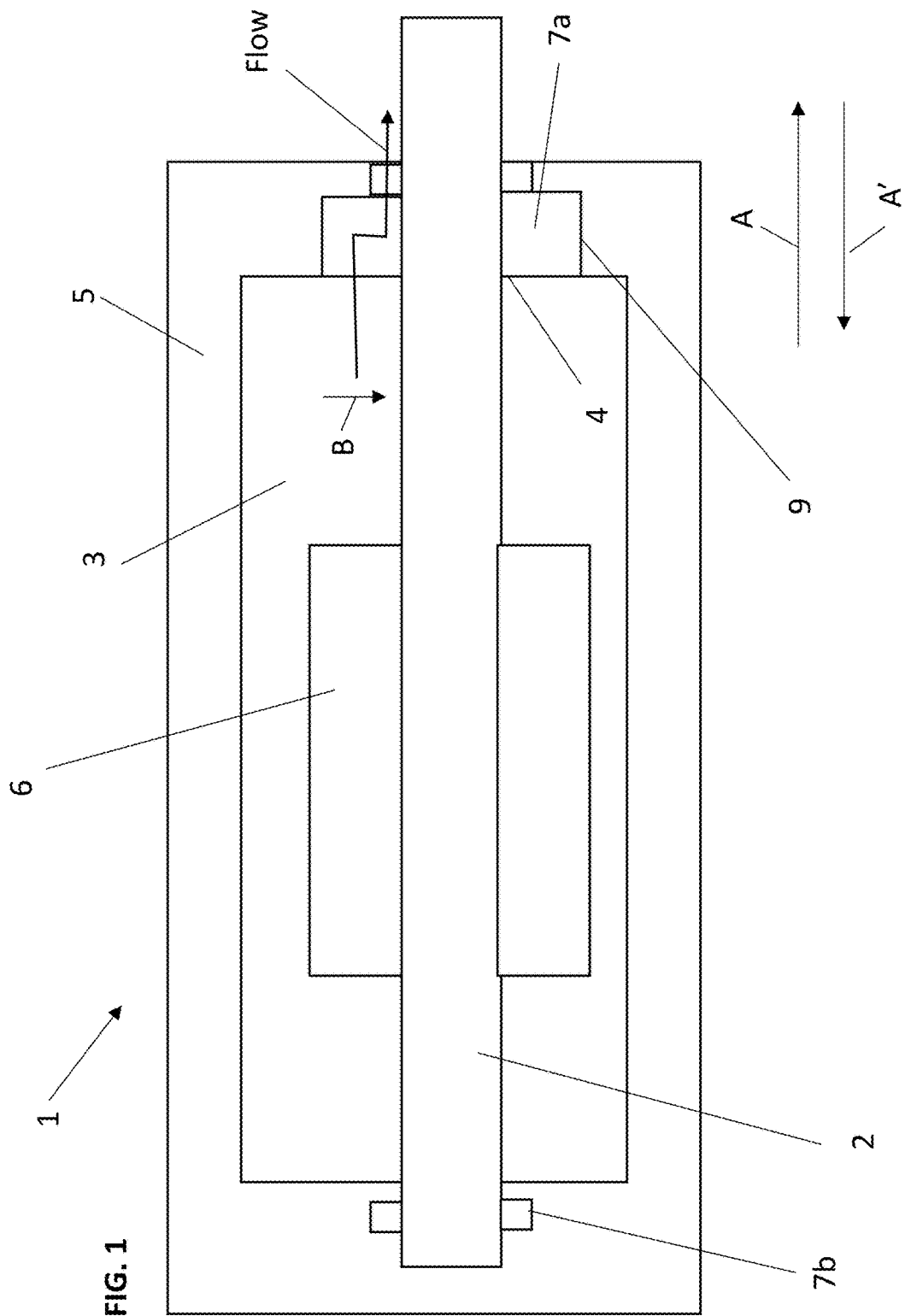
FIG. 1 is a cross-sectional view of a rotating machine that includes a pumping dry gas seal.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a connection path between two elements and does not imply a direct connection between the elements with no intervening elements/connections between them. All of these variations are considered a part of the specification.

DETAILED DESCRIPTION

A detailed description of one or more embodiments of the disclosed apparatus and method are presented herein by way of exemplification and not limitation with reference to the Figures.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

Turning now to an overview of technologies that are more specifically relevant to aspects of the invention, it shall first be understood that the teachings herein are applicable to all machines that include a rotating shaft (e.g., a rotor) shaft). Examples include electric motors, electric generators, flywheels, kinetic energy recovery systems (KERS), energy storage systems, gas turbines, wind turbines, steam turbines and couplings. In certain embodiments, at least a portion of the rotating shaft is enclosed in a sealed chamber.

The inventors hereof have recognized that such rotating shafts generate heat through churning of the gas environment within the sealed chamber. This heat amounts to energy being lost from the system and introduces inefficiencies. Given the number of rotating shafts worldwide, by having a simple technology that can limit this heat generation will save significant energy with the possible benefits of cost savings and reduced emissions.

Given the realization of this problem, embodiments herein are directed to systems and methods that can reduce the generation of heat due to churning. In a basic form this can be accomplished by reducing the pressure of gas in the seal chamber where the rotor is rotating. The chamber is sealed by a dry gas seal. A dry gas seal may suitably refer to a gas seal (i.e. to prevent passage of gas from one area to another) such as a non-contacting mechanical gas seal. It will be appreciated that material carried in a gas such as vapors and aerosols may in some instances also be present. The dry gas seal can be utilized to pump gas out of the chamber and thereby reduce the churning and associated heat in the chamber. The pressure in the chamber can be reduced to below atmospheric in the region where it is operating. In one embodiment, it is reduced to ½ or less than atmospheric such as less than 0.5 bar absolute.

FIG. 1 shows an example of rotating machine 1. The machine 1 illustrated could be a motor or generator, a vibrational damper, an alternator, a pump, a compressor, or a turbine, but the skilled artisan will realize the teachings herein are not so limited and could be applied to any machine with a rotating shaft.

The machine 1 includes a rotating shaft 2 (e.g. a rotor) that is sealed within a chamber 3. The chamber 3 is shown as having a single opening 4 through which the shaft 2 passes out of the chamber 3 via an opening 9. The skilled artisan will realize that the chamber could have multiple openings to accommodate situations where both ends of the shaft extend beyond the chamber 3. This can happen in a motor/generator as well as in the case of a coupling that is in a sealed chamber to name but few non-limiting examples.

The chamber 3 is defined by a housing 5. The housing 5 can be a motor or turbine housing in one embodiment. As shown, there is element 6 connected to the shaft 2 and within the housing 3. The element can be rotor windings, rotor magnets a coupling, a flywheel, or gearing, to name but a few. Of course, other examples could exist.

The opening 9 is filled at least partially or wholly by a dry gas seal 4. In this case, the seal 4 serves to pump gas out of the chamber 3 at a controlled rate. The path the gas takes is generally indicated by the arrow labeled "flow."

One or more bearings 7a, 7b may be provided within the housing 5 to support the rotating shaft. The first bearing 7a is shown as being outboard (direction A), of the seal 4 but the exact configuration can vary. As shown, the flow is radially inward (direction B) from the outer side of the seal 4 toward the shaft. The skilled artisan will realize that the direction could be reversed. The direction will be determined by many factors including the direction the grooves are oriented.

In general, dry gas seals such as the seal 4 shown in FIG. 1 operate by providing a seal between a rotating ring and a stationary. The rotating ring is sometimes referred to as a "mating ring" as it is mated to the rotating shaft/rotor. The rotating ring can be mated to the rotor via a shaft sleeve. The stationary ring can sometimes be referred to as the primary ring and does not rotate during operation.

In operation, a layer of gas is developed between the two rings that may form a seal or otherwise restrict flow while allowing the rings to move relative to one another without contacting each other. Grooves in the rotating (mating) ring draw the gas from a radial edge of the mating ring to a location in between the two rings. The gas that is drawn into the grooves is compressed as is moves toward the radially inward ends (or tips) of the grooves. The compressed gas creates a pressure dam that causes the primary ring to "lift off" from the mating ring to form a running gap that is in the range of few microns (e.g., 3-10 µm). To allow for relative axial movement between the rings, the primary ring is typically mounted to a stationary portion of the dry gas seal by a compressible member such as a spring or other implement.

In the below example a dry gas seal as a complete seal is shown. However, the skilled artisan will realize the teachings herein could be applied to any type of device that utilizes the pumping action of the relative rotation of two rings. One example is a nano machine where axial movements are very small and springs or other biasing elements may not be needed. Also contemplated are devices including, for example, an elastomer component that biases the non-rotating ring towards the ring that rotates.

After liftoff, a controlled amount of the gas flows (e.g., is pumped or otherwise allowed to move) over the dam area to the low-pressure side of the seal (e.g., outside of the sealed chamber), creating a controlled seal leakage, and the rings operate on the thin film of gas as a non-contacting seal. The controlled leakage can be utilized to, thus, pump gas out of the seal chamber and reduce the pressure therein. This can reduce heat in some embodiments. With reference to FIG. 1, the gas is pumped out is indicated by the arrow labeled "flow."

One of the seal rings or mating rings includes surface texture patterns so that it can draw gas between rings to cause a separation, or lift off, between the rings to allow for non-contacting operation. While the specific illustrated illustrate surface texture patterns are grooves, this is not meant as limiting and any type of surface pattern could be used so long as it supports the above-described separation or lift off and subsequent pumping of gas out of the chamber 3.

Figure 2:
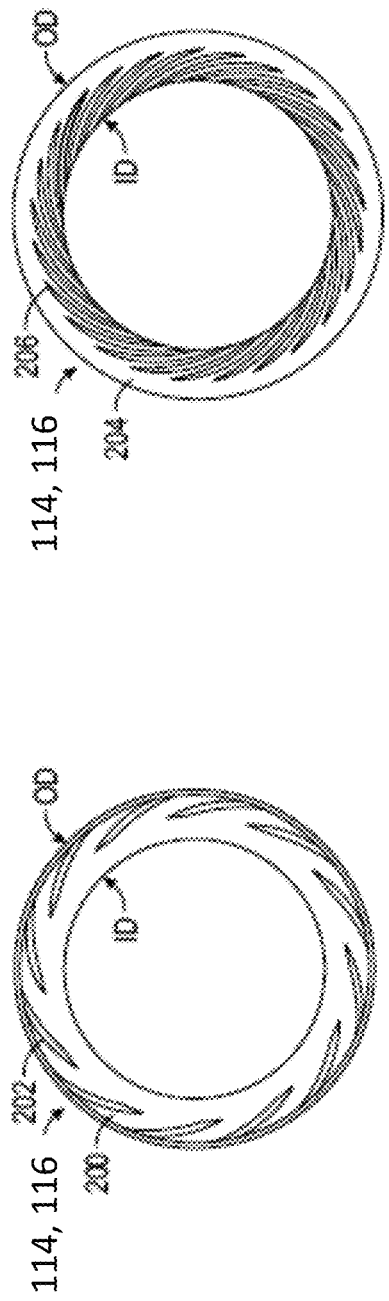
FIGS. 2A-2D show views of different types of faces that may be utilized in the dry gas seal so that it can be used as a pump for a rotating machine.

FIG. 2*a* shows an example of generic seal face 200 that can be a seal face of either a seal ring or a mating ring (114, 116). The surface texture patterns/grooves 202 in this face 200 are unidirectional and extend from an outer diameter OD towards an inner diameter ID.

FIG. 2*b* shows another example of a generic seal face 204 that can be a seal face of either a seal ring or a mating ring (114, 116). The surface texture patterns/grooves 206 in this face 204 are also unidirectional and extend from an inner diameter ID towards an outer diameter OD.

FIG. 2*c* shows another example of a generic seal face 208 that can be a seal face of either a seal ring or a mating ring (114, 116). The surface texture features/grooves 202 in this face 208 are bidirectional and extend from an outer diameter OD towards an inner diameter ID.

FIG. 2*d* shows another example of a generic seal face 220 that can be a seal face of either a seal ring or a mating ring (114, 116). The surface texture features 230 in this face 220 are bidirectional and extend from an inner diameter ID towards an outer diameter OD.

In any of these cases, as gas enters the surface texture features/grooves it is compressed as faces rotate relative one another to create the lift off force that causes the faces to separate. In any of the above examples, the surface texture patterns/grooves can have a depth that is sufficient based on the desired flow.

Figure 3:
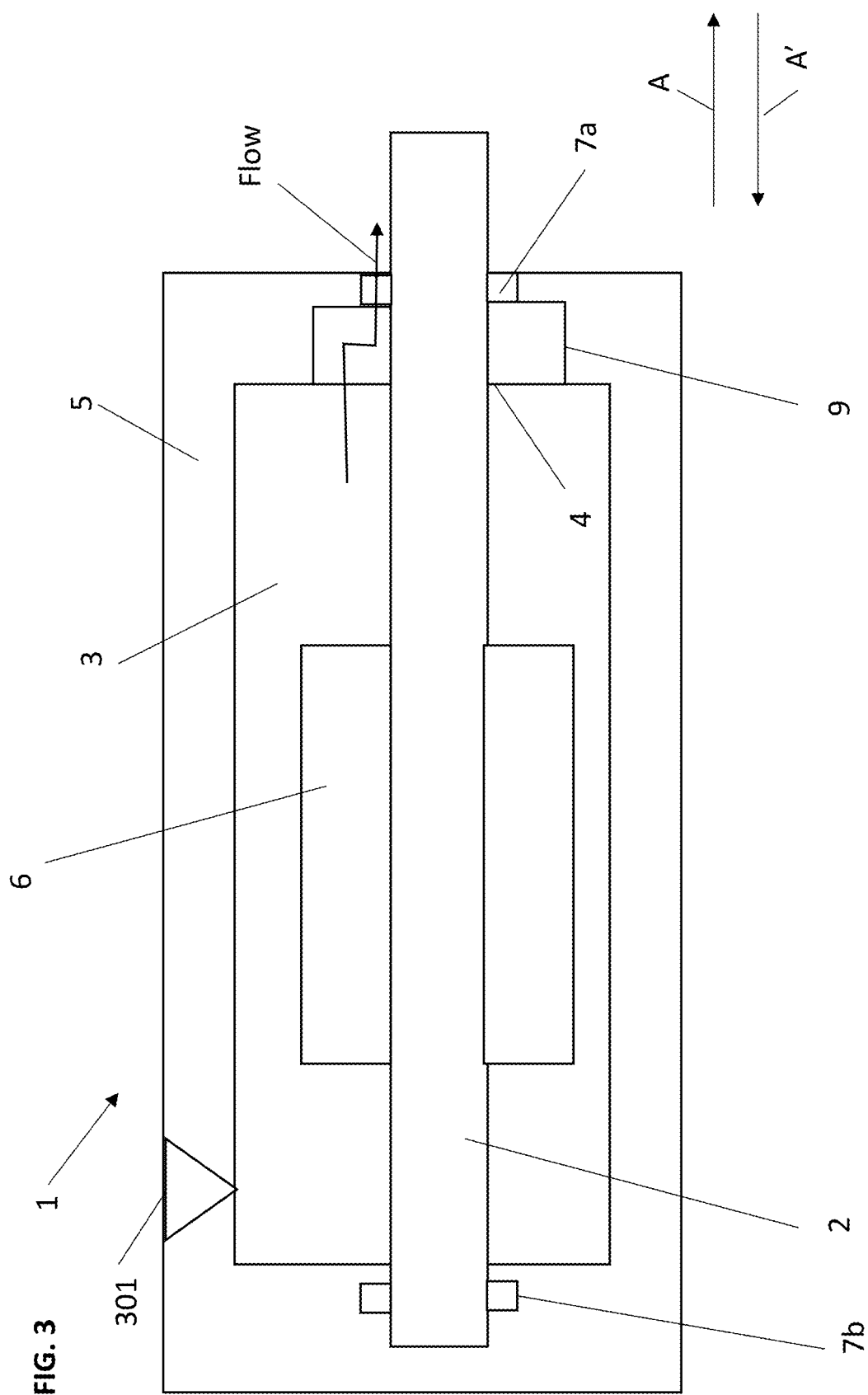
FIG. 3 is a cross-sectional view of a rotating machine that includes a pumping dry gas seal and a valve to restore gas into the chamber of the machine.
Figure 4:
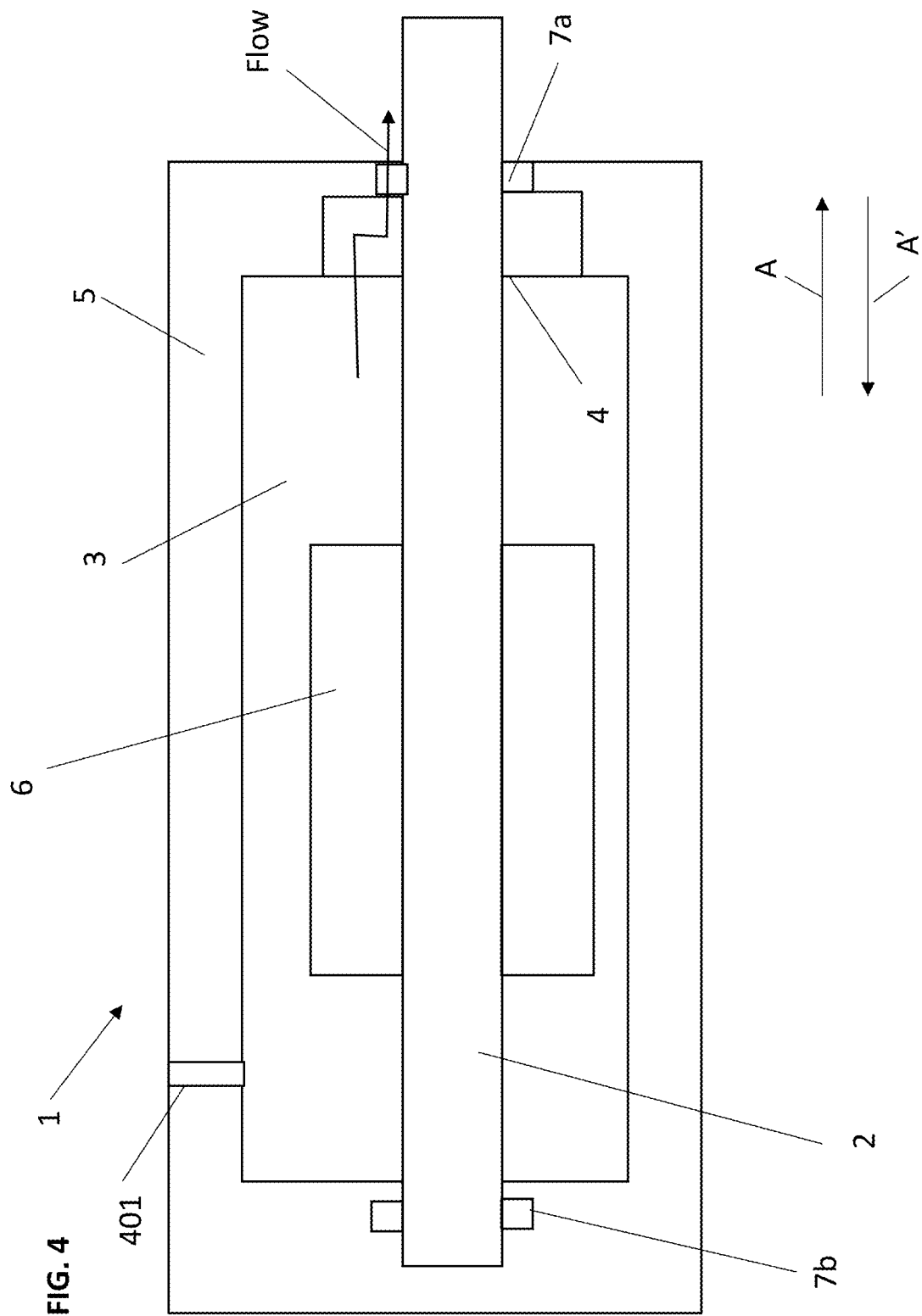
FIG. 4 is a cross-sectional view of a rotating machine that includes a pumping dry gas seal and a bleed hole to charge or restore gas into the chamber of the machine.

In operation, the seal 4 can serve to reduce pressure in the chamber 3. This process, or pumping, can in one embodiment reduce the pressure in the chamber to a level that is below the ambient pressure surrounding the chamber. In certain embodiments, the seal can be arranged such that the gas can be pumped out of the chamber until approaching vacuum conditions, thus reducing the gas density for churning. As shown below in FIG. 3, at a pressure close to vacuum, a relief valve 301 would open, or the seal could be designed to open with reverse atmospheric pressure to refill the chamber 3 for the process to start again. Alternatively, a small bleed hole 401 (or any other form of charge facility) could continually charge the system close to vacuum as shown in FIG. 4. In this or any other embodiment, the gas seal may open with reverse pressure to recharge.

In another embodiment, the gas seal pumps gas out of the housing to reduce pressure in the housing to an operating pressure that is less than the initial pressure in the housing. The initial housing pressure can be defined as the pressure after sealing the shaft in the housing and before pumping gas out of the housing with the dry gas seal.

In any configuration, reducing pressure reduces or eliminates the gas medium for churning and heat generation. For example, the gas could ½ the pressure of the initial pressure or less. Further, when close to vacuum, a thermal barrier can be established that will prevent the transfer of heat and high temperature. Of course, the extent to which the pressure is reduced can be affected by the initial pressure with high initial pressures being reduced typically more than lower pressures on a percentage basis.

While not fully shown herein for the sake of brevity, examples of dry gas seals that could be used include those disclosed in PCT Application PCT/US21/25126 and U.S. patent application Ser. No. 16/992,296 filed Aug. 13, 2020, both of which are incorporated herein by reference in their entirety. Of course, not all parts of that seal or the one shown in FIG. 5 below are required and only two rings as discussed above may be needed. In particular, the labyrinth seals and the separation seal may not be needed.

Figure 5:
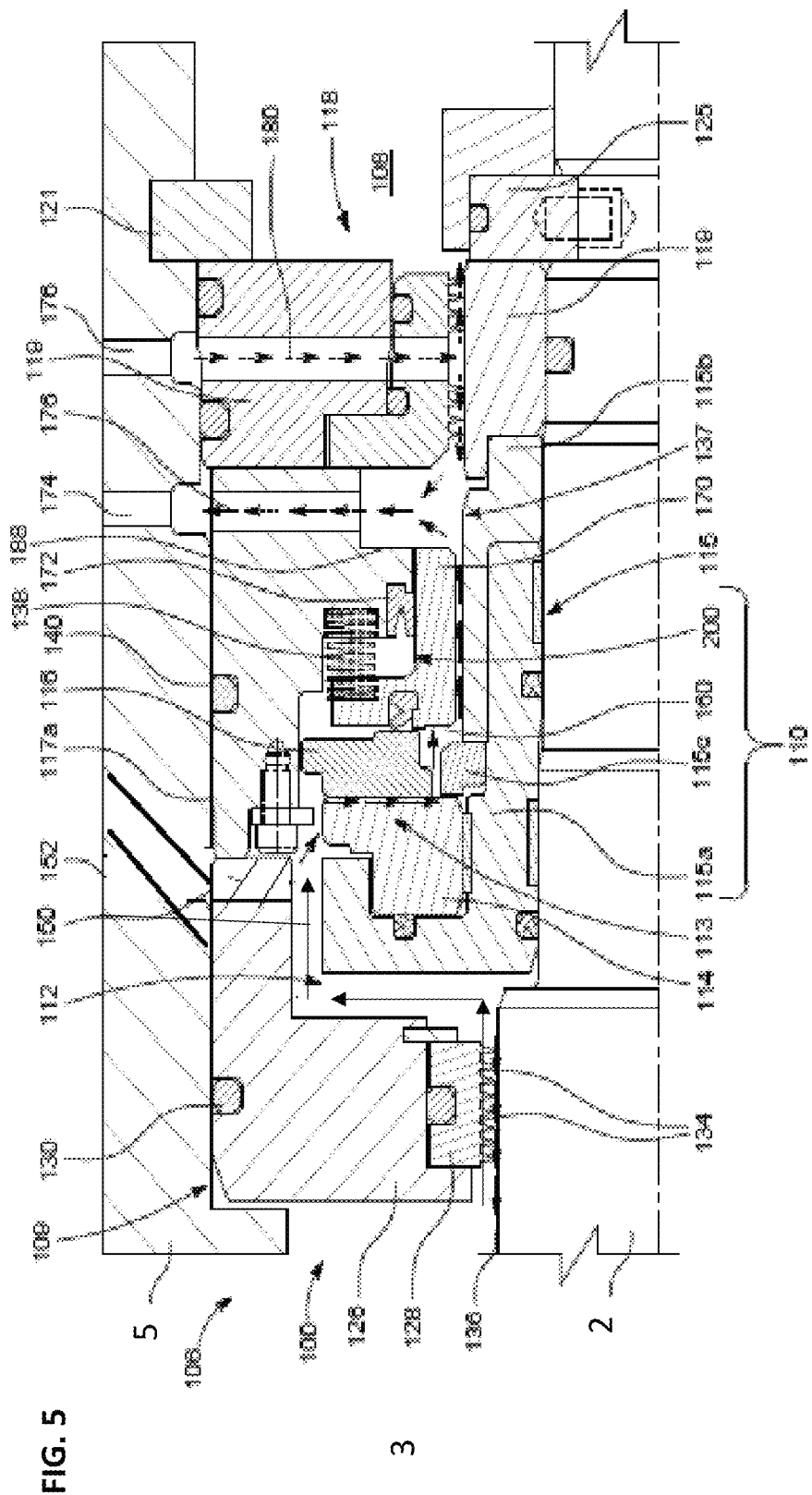
FIG. 5 is cross section one example of seal and could be used in embodiments and shows a gas path through the seal.

FIG. 5 is a partial cross-sectional view of the single non-contacting dry gas seal assembly 100 (or dry gas seal assembly for short). This assembly could be used to as the seal 4 shown in any prior embodiment. The teachings herein can be applied, however, to other dry gas seal configurations. As will be understood after reading the detailed description, the teachings herein can be applied to any type of dry gas seal including, without limitation single dry gas seals, tandem dry gas seals, tandem dry gas seals with intermediate an intermediate labyrinth, triple seals with or without a labyrinth and double opposed dry gas seals.

At least a portion of the dry gas seal assembly 100 is positioned between a rotating shaft 2 and the housing 5. A mating ring can be formed as part of the shaft 2 or otherwise attached to the shaft 2.

Figure 6:
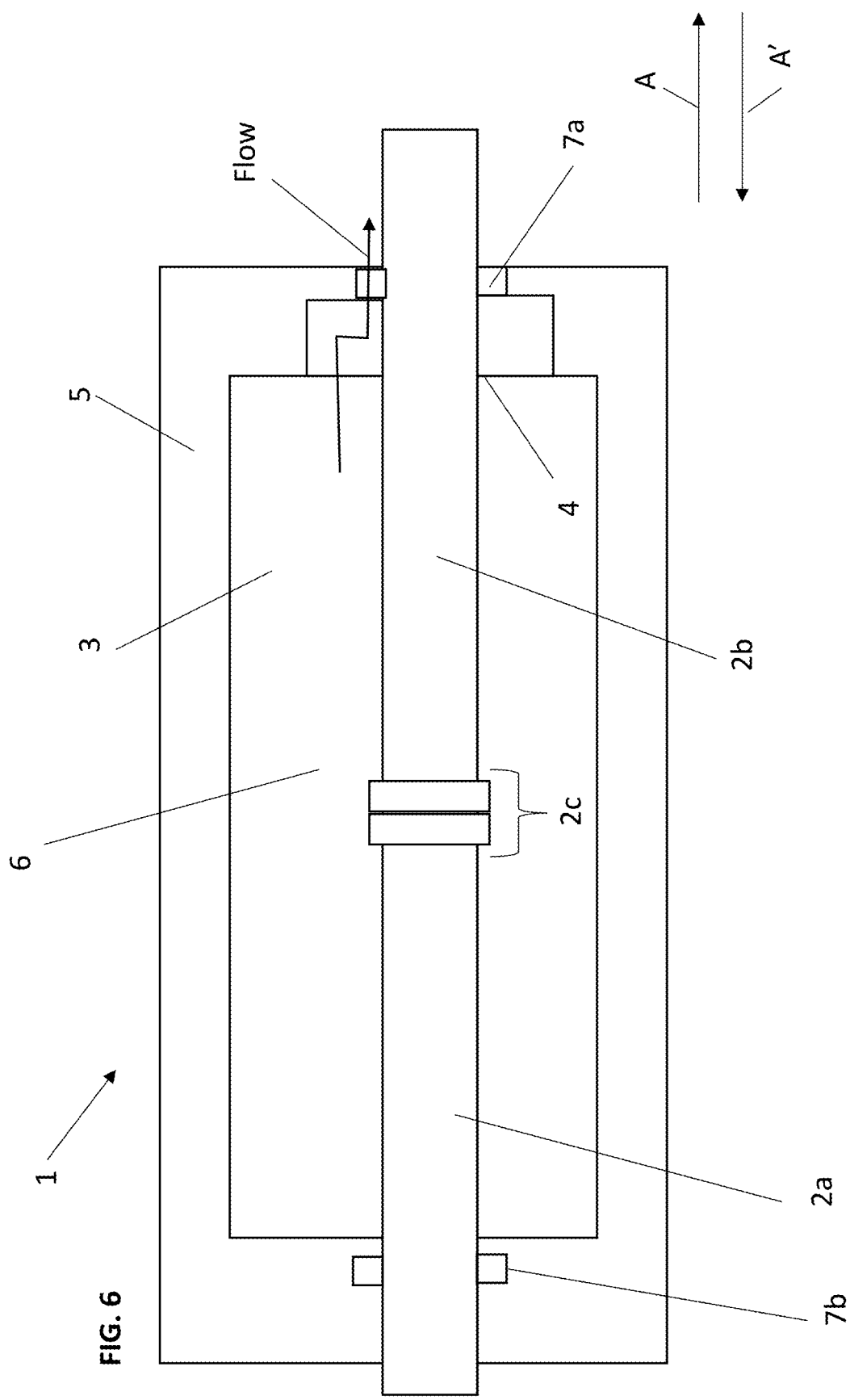
FIG. 6 shows a machine that includes chamber that has two shafts joined by a coupling.

The rotating shaft can be part of any rotating machine and may actually be a shaft formed of two parts (2*a* and 2*b*) that are joined together by a coupling 2*c* (see FIG. 6) that is contained within the chamber 3 defined by the housing 5. As above, the shaft 2 can be supported by the housing 5 via a bearing (not shown) disposed in a bearing cavity 108 of the housing 5. Also, the stator elements could be part of the housing rather than including their own retainer elements.

The housing 5 includes a bore 109 formed in it that extends between the chamber 3 and a bearing cavity 108 and defines an annular seal chamber 112 into which the dry gas seal assembly 100 may be inserted. The chamber includes the gas that is to be pumped out by the seal 4.

An optional shroud 126 that may include a labyrinth seal and which extends over a radially extending opening formed between the rotating shaft 2 and the housing 5 may be provided to inhibit the free flow of gas from the chamber 3 into the bore 109. The shroud 126 is disposed in the bore 109 and, as illustrated carries a labyrinth seal 128 that serves to totally or partially prevent the free flow of process gas from the process cavity 106 into the bore 109.

At its radially inner end, the labyrinth seal 128 includes a plurality of ridges 134. In operation, the ridges 134 are disposed close to an outer surface 136 of the rotating shaft 102. The plurality of ridges 134 and the corresponding intermediate cavities formed between any two consecutive ridges 134 impede the ingress of gas from the process cavity 106 into the seal chamber 112 by way of the rotating shaft 2.

The dry gas seal assembly 100 illustrated in FIG. 5 includes a single dry gas seal that is generally referenced as first seal 110. Typically, the components of the first seal 110 are preassembled into a cartridge and then disposed in the seal chamber 112. The cartridge 118 includes a stator 117 that can be formed of one or more components and joined in a fixed relationship to one another as well as with the compressor housing 104 when installed. As shown, the stator 117 includes a retainer ring 117*a* that can be sealed to the chamber 3 by a sealing element such as a radial seal 140.

The cartridge 118 can also include a sleeve ring 115 that can be formed of one or more components and that is attached to the rotating shaft 2 such that it rotates with the rotating shaft 2. However, in one embodiment, a cartridge can be omitted. For example, the mating ring could be part of the shaft and the primary ring can be built into the housing.

The illustrated sleeve ring 115 includes two portions 115*a*, 115*b* in FIG. 5. In particular, the sleeve 115 includes a rotating ring 115*a* that is configured to contact and rotate with the rotating shaft 2. In the illustrated embodiment, a spacer sleeve 115*b* is included as part of the sleeve 115. Of course, the sleeve ring 115 could be formed as a unitary piece or could include any number of pieces that are either joined together or otherwise held stationary relative to each other during operation (e.g., all pieces rotate together as one).

The illustrated cartridge 118 also includes what is sometime referred to as a separation seal 119. Of course, the separation seal 119 is not required as part of dry gas seal in general and may be a separate element that is joined to a dry gas seal. The separation seal can serve to prevent or reduce oil or other lubricants from a bearing (not shown) disposed in the bearing cavity 108 from entering the first seal 110. The separation seal 119 may also prevent or reduce the ingress of contaminates from an external environment. Contaminates may for example include one or a combination of dirt, debris, or other undesired particles or liquids.

It shall be appreciated that the separation seal 119 is not required in certain embodiments. That is, embodiments herein do not require that the separation seal as part of the cartridge 118. Further, as shown in one or more of the following embodiments, if present, the separation seal 119 need not be adjacent the first seal 110 and one or more other seals could be provided between the first seal 110 and the separation seal 119.

Axial movement of the sleeve ring 115 relative to the rotating shaft 102 is limited by a shaft thrust ring 125 received in a groove in the rotating shaft 102. Axial movement of the stator 117 is limited by stator thrust ring 121 received in a groove in the housing 5.

In the above example, it should be understood that the shaft thrust ring 125 can be fixed relative to the sleeve ring 115 so that the two elements rotate together. Also, for sake of completeness, it shall be understood that other elements can be attached to the sleeve ring 115 to provide support or other functions but are not specifically described herein. One optional example is a mating ring position fixing element 115*c*.

The sleeve ring 115 carries and otherwise mates rotating or mating ring 114 to the rotating shaft 2. That is, the sleeve ring 115 being mated to the rotating shaft 102 allows the mating ring 114 to also rotate with the shaft 102. The mating ring 114 can include one or more grooves (not shown) formed on a face thereof. Examples of such grooves as shown above in FIG. 2.

The primary ring 116 can also be referred as stationary ring as it does not rotate with the shaft and is thus, generally or completely, rotationally stationary relative to the housing during operation. Reference numeral 113 identifies the location of the seal interface formed between the mating ring 114 and the primary ring 116.

As will be understood by the skilled artisan, primary ring 116 is axially movable relative to the housing 104 during operation such that a controlled distance may be maintained between the mating ring 114 and the primary ring 116 at the seal interface 113. In the illustrated embodiment, a spring force is applied to the primary ring 116 by one or more biasing members 138 disposed between the retainer ring 117*a* and the primary ring 116.

During operation, gas is present in the chamber 3. The gas is present in a so-called seal chamber 112 and its path through the seal is shown arrows 150.

Rotation of the mating ring 114 due to its connection to the rotating shaft 102 will cause some of the gas in the seal chamber 112 to be drawn from an outer diameter of the mating ring 114 into the groves formed therein. The shape of the grooves is optimized to enhance seal performance. The grooves are shaped to have a tip such that gas enters the grooves is compressed because of the volume reduction at the tips. The area of slightly higher gas pressure creates a pressure dam and results in a so-called "lift off" resulting in physical separation of the primary and mating rings 116, 114. As such, in operation, gas flows over the dam area (between the primary and mating rings, 114) to a downstream side 160 of the seal interface 113. Gas that passes through the seal interface can exit the dry gas seal assembly 100 via a vent 174 in the housing 5 or by other means.

To allow for the above described lift off, a carrier ring 170 is provided as a means for allowing the required movement. The carrier ring 170 is coupled to the retainer ring 117*a* by the biasing members 138. The biasing members 138 can be a singular element or composed of a plurality of elements. The biasing members 138 are comprised of one or more springs in one embodiment.

The biasing members 138 can allow for the primary ring 116 to keep a constant distance during operation between itself and the mating ring 114 even as the mating ring 114 moves axially due to such movement of the rotating shaft 102.

To ensure that gas cannot travel around the seal interface 113 in an uncontrolled manner, one or more radial seals may be provided. The seals may be formed of a polymer or an elastomer and one example of such a seal is a lip seal. In FIG. 5 the seal is illustrated as a lip seal but that is by way of example only and not meant to be limiting. As illustrated, a first seal 172 can be provided between retainer ring 117*a* and the carrier ring 170. The first seal 172 is fixed relative to the retainer ring 117*a* in one embodiment. This first seal 172 can be arranged such that the sealing gas follows path 150 and causes it to expand when gas impinges upon. The first seal 172 is, thereby, a so-called contact seal. As the primary ring 116 moves (either due to lift off or shaft movement) the carrier ring 170 will move relative to the first seal 172. A seal may also be provided between the primary ring 116 and the carrier ring 170, which may suitably be formed from a polymer or an elastomer.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary machine comprising:
   a rotating shaft;
   a housing that surrounds a portion of the rotating shaft;
   a gas seal configured to pump gas out of the housing so that a pressure in the housing is less than atmospheric pressure; and
   means for recharging the housing with atmospheric air when the pressure in the housing falls below a threshold.

2. The rotary machine of claim 1, wherein the pressure in housing is less than ½ atmospheric pressure.

3. The rotary machine of claim 1, wherein the rotating shaft is a rotor of a motor.

4. The rotary machine of claim 1, wherein the rotating shaft comprising two portions joined together by coupling.

5. The rotary machine of claim 4, wherein the coupling is within the housing.

6. The rotary machine of claim 1, wherein the means for recharging are a bleed hole formed in the housing that allows ambient air to be drawn into the housing.

7. The rotary machine of claim 1, wherein means for recharging are a valve configured to control a flow of ambient air into the housing based on the pressure in the housing.

8. The rotary machine of claim 1, wherein the dry gas seal includes:
   a mating ring that can be coupled to the rotating shaft to rotate with the rotating shaft; and
   a primary ring.

9. The rotary machine of claim 8, further comprising:
   a biasing member configured to urge the primary ring towards the mating ring.

10. The rotary machine of claim 8, further comprising a sleeve ring that is coupled to the rotating shaft and carries the mating ring.

11. A method of operating a rotating machine that includes a rotating shaft and a housing that surrounds a portion of the rotating shaft, the method comprising:
    sealing the shaft in the housing with a dry gas seal;
    establishing an initial pressure in the housing; and
    pumping gas out of the housing with the dry gas seal so that pressure in the housing is reduced from the initial pressure to a lower pressure;
    recharging the housing with atmospheric air when the pressure falls below a threshold.

12. The method of claim 11, wherein the initial pressure is atmospheric pressure and the lower pressure is less than ½ atmospheric pressure.

13. The method of claim 11, wherein the rotating shaft is a rotor of a motor.

14. The method of claim 11, wherein the rotating shaft comprising two portions joined together by coupling.

15. The method of claim 14, wherein the coupling is within the housing.

16. The method of claim 11, wherein the means for recharging is a bleed hole formed in the housing.

17. The method of claim 11 wherein the means for recharging is a valve that controls a flow of ambient air into the housing.

18. A rotary machine comprising:
    a rotating shaft;
    a housing that surrounds a portion of the rotating shaft and has an initial pressure therein; and
    a gas seal configured to pump gas out of the housing to reduce pressure in the housing to an operating pressure that is less than the initial pressure;
    means for recharging the housing with atmospheric air when the pressure in the housing falls below a threshold.

19. The machine of claim 18, wherein the means for recharging are a hole in the housing or a control valve.

* * * * *